Oct. 23, 1956

F. J. A. HUBER 2,767,919

TRUE AIRSPEED COMPUTER

Filed July 8, 1955

INVENTOR.
FRANZ J. A. HUBER
BY
ATTORNEYS

Oct. 23, 1956  F. J. A. HUBER  2,767,919
TRUE AIRSPEED COMPUTER
Filed July 8, 1955  3 Sheets-Sheet 2

INVENTOR.
FRANZ J.A. HUBER
BY
ATTORNEYS

Oct. 23, 1956     F. J. A. HUBER     2,767,919
TRUE AIRSPEED COMPUTER

Filed July 8, 1955     3 Sheets-Sheet 3

INVENTOR.
FRANZ J. A. HUBER
BY
ATTORNEYS

United States Patent Office 2,767,919
Patented Oct. 23, 1956

2,767,919
TRUE AIRSPEED COMPUTER
Franz J. A. Huber, Dayton, Ohio

Application July 8, 1955, Serial No. 520,937

5 Claims. (Cl. 235—84)

(Granted under Title 35, U. S. Code (1952), sec. 266)

The invention described herein may be manufactured and used by or for the United States Government for governmental purposes without payment to me of any royalty thereon.

The present invention includes a cursor designed for use with true airspeed computers made in accordance with the principle disclosed in U. S. Patent 2,528,518 for True Airspeed Computer patented Nov. 7, 1950, by Franz J. Huber.

In the true airspeed computer disclosed in the above U. S. patent, the exact true airspeed can be determined from three flight instrument readings with only two computer settings. The three instrument readings are: indicated airspeed, pressure altitude and indicated temperature for a constant temperature recovery coefficient. It is assumed that the instrument readings do not contain any instrument or position error, i. e., that they are calibrated values. The air is treated as a perfect gas, which means that the gas constant and the ratio of the specific heats are constants.

The temperature recovery coefficient (later referred to as $C_T$) assumed to be constant in the above computer design is actually not a constant but depends on the thermometer design and upon the individual conditions of the specific flight. Its range of variation covering the various thermometer designs and flight conditions is generally 0.7 to 1.0.

The object of the present invention is to provide an improved cursor designed for use on true airspeed computers of the slide rule type designed according to the patent above noted.

A further object of the invention is the provision of a computer which performs all of the functions of the computer in the device of the above noted patent, and in addition makes it possible to consider a variable $C_T$ in the determination of true airspeed with no additional computer setting required.

A further object of this invention is the provision of a cursor as above described which allows the computation of the true airspeed for a variable $C_T$ as a function of true free air temperature and/or the corresponding standard atmosphere altitude.

A further object of the invention is the provision of a device which makes possible (for a given Mach number, indicated temperature and $C_T$) the determinations of true airspeed and temperature rise. These determinations are made easily, accurately and quickly with one setting of the cursor.

These and other objects will become apparent as the description proceeds.

In the drawings, Fig. 1 is a front view of the true airspeed computer.

Fig. 2 is a front view of the cursor.

Fig. 3 is a front view of the upper disc.

Fig. 4 is a front view of the lower disc.

Figures 1, 2:
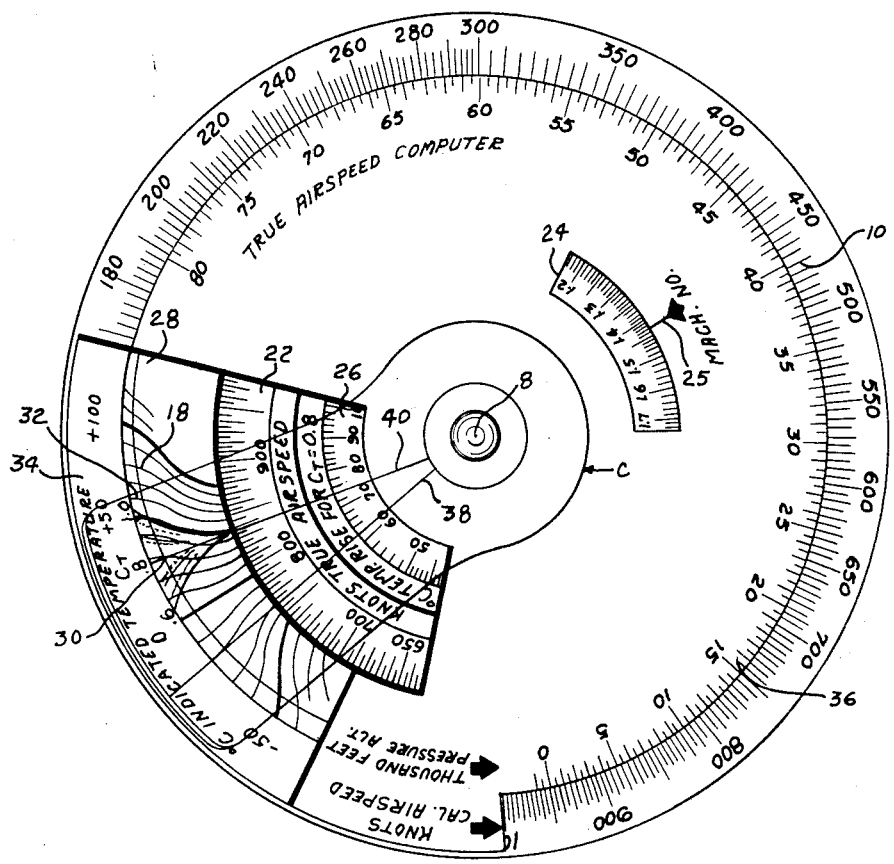
Figs. 2, 3 and 4 are views of the individual parts disassembled.
Figure 3:
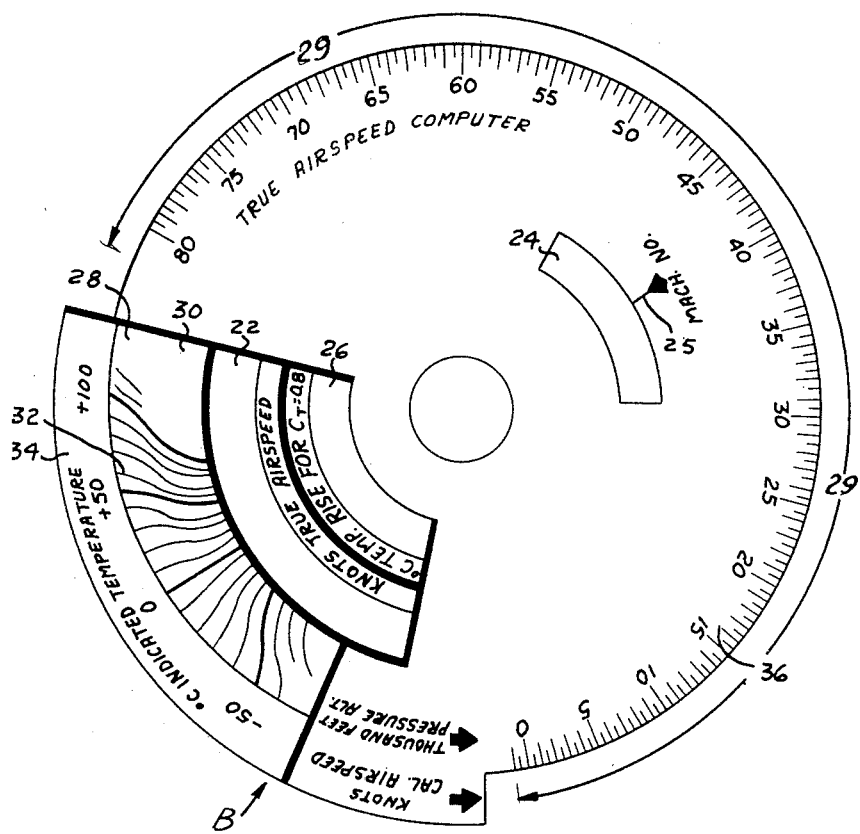
Figure 4:
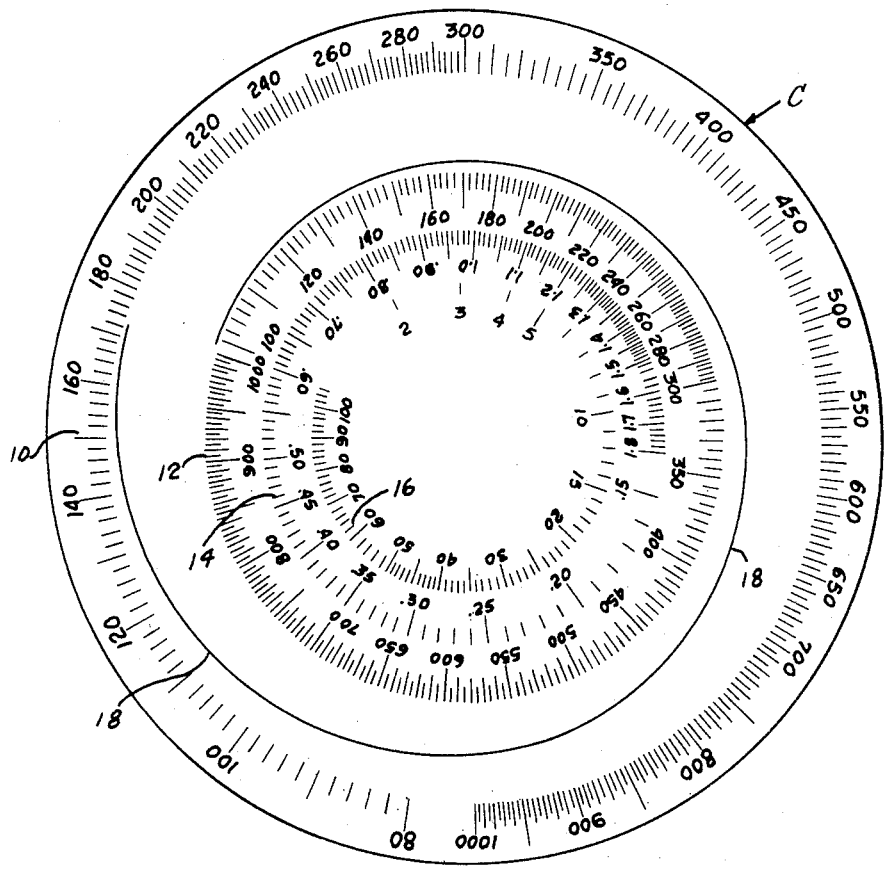

Referring more in detail to the drawings, the cursor of the computer is indicated by the letter A, the top or upper disc by the letter B, and the lower disc by the letter C.

When assembled, the upper disc is superimposed upon the lower disc and pivoted at the center of each by a rivet 8 or any other suitable means which will allow them to rotate freely with respect to each other. The cursor A, made of transparent material, is pivoted or otherwise secured at the center for arcuate movement over the face of the upper disc.

Briefly stated, the computer is based on the fact that the Mach number is determined by the ratio of the pitot-static preessure difference to the static pressure, the pitot-static pressure difference being given in terms of indicated airspeed and the static pressure in terms of pressure altitude, and that for a given Mach number, the true airspeed is a function of the indicated temperature and $C_T$.

The lower disc C has an unbroken surface and carries a series of concentric scales 10, 12, 14 and 16.

The outermost scale 10 is a logarithmic scale in pitot-static pressure difference to the static pressure, the pitot-indicated airspeed in knots. Radially inward, the next scale 12 provides indicia for true airspeed in knots. The Mach number scale 14 is located adjacent to and radially inward from 12. This scale expresses the ratio of pitot-static pressure difference to static pressure in terms of Mach number. Nearest the center, the scale 16 provides temperature rise in degrees centigrade where the value of $C_T$ is considered as a constant, 0.8 for this computer.

The lower disc C also carries a spiral reference line 18. Since the graduation of the indicated temperature scale has to vary when Mach number changes, this spiral, shifting in a radial direction, is coordinated with indicated temperature curves, which are plotted on a window in the upper disc (later to be described) through which the spiral is visible. As the discs are rotated with respect to each other, the spiral cuts across the indicated temperature curves and moves inward or outward as the Mach number changes. The intersections of the indicated temperature curves with the spiral form an indicated temperature scale, which automatically varies its graduation in the required manner as the Mach number changes.

The upper disc B is provided with windows which reveal portions of each of the scales on the lower disc, and the scales in the lower disc are identified by legends appearing on the upper disc adjacent to the appropriate window. Scale 10 is identified as "Knots Cal. Airspeed." The disc B has a portion 29 of its circumferential area either cut away or made of transparent material to reveal this scale. Scale 12 is identified by the legend "Knots True Airspeed," and an arcuate window 22 reveals a portion of this scale.

A scale 14 is identified by the legend "Mach No." and an arcuate window 24 in the upper disc is radially located to reveal portions of this scale. The Mach number is indicated by a pointer 25.

An arcuate window 26 reveals the innermost scale and the identifying legend "° C. Temp. Rise for $C_T=0.8$" appears on the upper disc adjacent to this window.

A fourth arcuate window 28 is covered with a transparent or semi-transparent covering which carries indicated temperature curve 32 which range from −80° C. to +120° C. This window is so located radially that upon rotation of the two discs relative to each other any portion of the spiral reference line 18 may be revealed. The window 28 has a opaque arcuate frame portion 34 lying at the circumferential area of the upper disc B, and overlapping a portion of the indicated airspeed scale. This frame portion carries the legend "° C. Indicated Temperature."

The upper disc has a peripheral scaled zone 36 and the identifying legend "Thousand Feet Pressure Altitude." This scale is a logarithmic scale in static pressure and is graduated for convenience in thousand feet altitude.

All of the above noted devices are disclosed and their functions and computations explained in the patent noted above.

The present invention resides in the cursor arm A, the legends and indicia thereon, and their interrelation with the indicia and scales of the upper and lower discs.

As shown, the cursor A is made of transparent material and is pivoted to rotate about the center pivot 8, and is operable to swing arcuately over the face of the top disc to be positioned at any desired point. A hairline 38 corresponds to the hairline in the above referred to patent. This hairline is used to solve problems of true airspeed determination where the $C_T$ of the thermometer is considered as a constant value 0.8. This value 0.8 is the basic layout $C_T$ of this computer.

The value of $C_T$ may vary from about 0.7 to 1.0 depending on thermometer design and flight conditions. For purposes of computing true airspeed taking these varying values of $C_T$ into consideration, a second hairline 40 is provided on the cursor A. The straight extension of the hairline corresponds to a $C_T$ value of 0.8 and serves all of the functions performed by the hairline 38, and in addition allows for variations of the value of $C_T$. To the right and to the left of the hairline 40, are a series of fanned out curves 42 and 44. Each of the curves is plotted on the cursor for a fixed $C_T$ value, the one at the extreme left being $C_T=.6$. The value increases to the right, the one at the extreme right being $C_T=1.0$.

Two families of $C_T$ curves have been plotted because, for a $C_T$ value other than the basic layout value of the computer, the shape and location of the $C_T$ curve depends on the free air temperature. These two families are represented by solid curves 42, and closely adjacent dotted curves 44. This provides a means for computing true airspeed for a variable $C_T$ with consideration of free air temperature ranging between standard sea level ($+15°$ C.) and standard stratosphere ($-55°$ C.).

These pairs of curves could be plotted as single curves computed for a temperature which is an average of the temperatures occurring most frequently during the flight schedule. This method, of course, would not be as minutely accurate as the double curve 42, 44 described above, but the computer setting would be simpler, and subject to less confusion.

The method of plotting the $C_T$ curves shown in the drawing is as follows: (In this example, the basic layout $C_T$ of the computer is 0.8, the true free air temperature is that of standard sea level conditions, and the range of $C_T$ covered is 0.6 to 1.0).

1. Compute for a chosen true airspeed and standard sea level temperature, the Mach number and the indicated temperature of the $C_T$ for which the true airspeed scale is laid out (e. g., $C_T=0.8$).

2. Compute the true airspeeds for the above Mach number and indicated temperatures for various $C_T$ values (e. g., 0.6, 0.7, 0.9 and 1.0).

3. Compute the angular distances on the true airspeed scale between the true airspeeds computed in Step 2, and the true airspeed chosen in Step 1.

4. Plot these angular distances on the cursor from the radial hairline at the radius of spiral point corresponding to the true airspeed chosen in Step 1.

5. Repeat Steps 1 to 4 for various chosen true airspeeds and draw curves through the points of constant $C_T$ on the cursor. For any other true free air temperature the $C_T$ curves on the cursor, are obtained analogously.

Instructions for the use of the computer may be printed on the face of the upper dial. For purposes of clarity and to avoid confusion in the presentation of the drawings, this instruction and explanation has been omitted. They are as follows:

*Instructions*

1. Set calibrated airspeed opposite calibrated pressure altitude. Read Mach number opposite arrow.

2. Set temperature recovery coefficient, $C_T$ on indicated temperature at referenced spiral (for $C_T=0.8$ use left radial line for convenience). Read true airspeed under radial line.

Read temperature rise (for true airspeed and $C_T=0.8$) under same radial line and multiply by ($1.25 \times C_T$) to obtain correct temperature rise.

*Note.*—True free air temperature=indicated temperature—temperature rise.

For a $C_T$ value other than 0.8 the $C_T$ curve on the cursor depends on the free air temperature. Therefore, $C_T$ curves are drawn for standard sea level temperature and standard stratosphere temperature.

To illustrate the operation of the device the following problem is presented:

Given:
 Calibrated indicated airspeed ____knots__ 300
 Calibrated pressure altitude _____feet__ 60,000
 Indicated temperature _____° C__ +30
 Temperature recovery coefficient (*a*) 0.8, (*b*) 1.0

To find:
 Mach number
 True airspeed
 Temperature rise at the thermometer

Set 60 on the thousand feet pressure altitude scale opposite 300 on the calibrated indicated airspeed scale. Mach number 1.427 is obtained. (The Mach number does not depend on $C_T$.)

Then (for (*a*)) place the .8 hairline at the intersection of the $+30°$ C. indicated temperature curve and the spiral reference line. This point is indicated on the drawing by the reference numeral 30. The true airspeed 838 knots and temperature rise of 74° are obtained. Now (for (*b*)), slide the cursor arm to the left until the solid 1.0 curve lies on the intersection of the 30° C. indicated temperature curve and the spiral reference line. The true airspeed of 814 knots for $C_T=1.0$ and the temperature rise of 70° C. for this speed and $C_T=0.8$ are obtained.

It will thus be seen that with one setting of the cursor two determinations are made: (1) true air speed; (2) temperature rise at the thermometer for the correct true airspeed and the basic layout $C_T$ of the computer.

The position of the cursor shown in Fig. 1 of the drawing is the position for solution of the first condition of the problem, i. e., the use of the 0.8 value for $C_T$. The reference spiral, fixed in relation to the Mach number, intersects at a certain point 30 the indicated temperature curve for $+30°$ C. The hairline for 0.8 is placed at this intersection and the true airspeed and temperature rise are read under the hairline. For $C_T=1.0$ the cursor would be rotated counterclockwise until the solid 1.0 line, which is valid for standard stratosphere temperature, coincides with the intersection of $+30°$ C. temperature curve and the reference spiral 18. This position is not shown on the drawing.

The device has been described with reference to two centrally pivoted relatively rotating discs and a cursor also centrally pivoted for arcuate movement over the face of the upper disc. The radial arrangement of the scales may be changed if desired. The invention is not limited to this relationship of moving parts. The idea of the invention is also adaptable to use in linear slide rules, the cursor in this case being a linearly sliding element.

For purposes of exemplification particular embodiments of the invention have been shown and described according to the best present understanding thereof. However, it will be apparent that many changes and modifications in the arrangement and construction of the parts thereof may be resorted to without departing from the true spirit and scope of the invention.

I claim:

1. A true airspeed computing slide rule device comprising two relatively slidable members, a first logarithmic scale expressing the pitot-static pressure difference in terms of indicated airspeed on one of said members, a second logarithmic scale expressing static pressure in terms of pressure altitude on the other of said members, a third logarithmic scale on said first member expressing the ratio of pitot-static pressure difference to static pressure in terms of Mach number, a reference spiral on said first member, the graduation of which varies with Mach number, an indicated temperature index on said second member, said indicated temperature index comprising curves of constant indicated temperature, said curves being in coordinated relation to said reference line to form an indicated temperature scale along said reference spiral; a fourth scale on said first member expressing true airspeed as a function of the indicated air temperature for computed Mach numbers; a transparent cursor slidably mounted with respect to said second member, said cursor having plotted thereon curves of constant temperature recovery coefficient to be set on indicated temperature for obtaining true airspeed and temperature rise for a variable temperature recovery coefficient.

2. In a true airspeed computer of the slide rule type, wherein the Mach number is determined through relationship of calibrated airspeed and pressure altitude, and wherein a true airspeed reading is made by means of an indicator whose position is determined by an indicated temperature and Mach number relationship reference spiral, coordinated with an indicated temperature scale, the indicated temperature being valid for an assumed constant temperature recovery coefficient; a cursor, plotted curves on said cursor coordinating with said reference spiral for indicating reading of true airspeed, said plotted curves providing for a range of temperature recovery coefficient.

3. A device according to claim 1 wherein said last named means comprises a hairline on said cursor, curves on said cursor plotted with reference to Mach number and indicated temperature for varying values of temperature recovery coefficient, said curves being set on indicated temperature to obtain true airspeed and temperature rise readings.

4. A cursor for a true airspeed computer having a calibrated airspeed scale, a pressure altitude scale, a true airspeed scale, indicated temperature curves, a Mach number scale and a reference spiral, said scales, curves and spiral being coordinated, a radial hairline on said cursor coordinating with said curves and said spiral to provide true airspeed readings for a constant temperature recovery coefficient for any given calibrated airspeed and pressure altitude, or Mach number, curves on said cursor for providing, in addition, true airspeed readings for a variable temperature recovery coefficient considering a variable free air temperature.

5. In a true airspeed computer of the slide rule type, wherein the Mach number is determined through relationship of calibrated airspeed and pressure altitude, and wherein a true airspeed reading is made by means of an indicator whose position is determined by an indicated temperature and Mach number relationship reference spiral, coordinated with an indicated temperature scale: a cursor, families of plotted curves on said cursor, each curve coordinating with said spiral for indicating reading of true airspeed, each family indicating true airspeed for a varied range of temperature recovery coefficient, these families of curves allowing also for a range of free air temperature between sea level temperature and stratosphere temperature.

No references cited.